July 4, 1967 S. H. MOORE ET AL 3,329,381
HOSE RACKS
Filed March 11, 1965
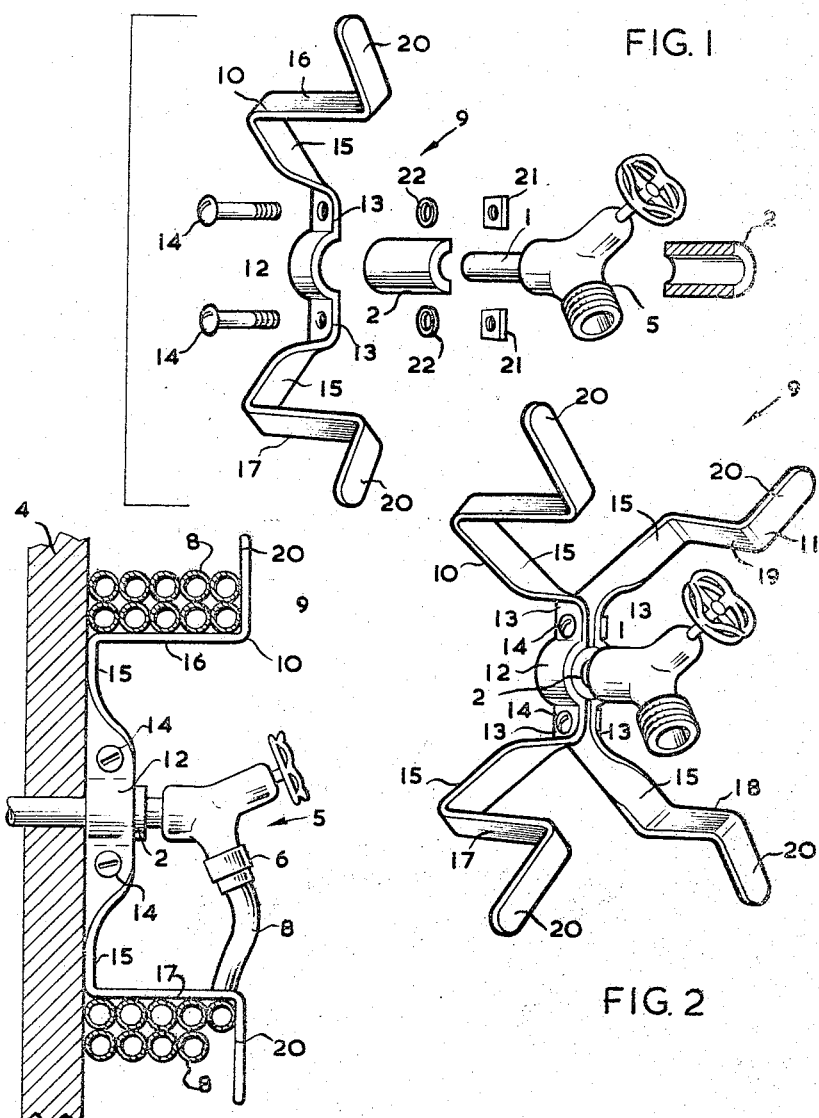
INVENTORS
STANLEY H. MOORE
ROY R. POLOZ
RICHARD EVANS
BY:
ATTORNEYS

United States Patent Office 3,329,381
Patented July 4, 1967

3,329,381
HOSE RACKS
Stanley H. Moore, 26 Stevens Crescent, Georgetown, Ontario, Canada; Roy R. Poloz, 29 Windermere Crescent, Brampton, Ontario, Canada; and Richard Evans, Brampton, Ontario, Canada; said Evans assignor to said Moore and said Poloz
Filed Mar. 11, 1965, Ser. No. 439,028
4 Claims. (Cl. 248—89)

The invention relates to improvements in hose racks.

Prior known devices used to support garden hoses when not required for use usually take the form of a reel upon which the hose may be wound, or a rack which may be attached to the wall of a building. The disadvantages of the reel types lie in the fact that they are generally quite bulky and expensive and usually require that the hose be detached from the water tap prior to being reeled in. The other types of racks while being much more simple in construction than the reel types, have the disadvantage that a screw or other supporting device must be driven into the masonry in order to support them, and this is generally time consuming and often causes damage to the wall.

We propose overcoming the disadvantages of previously known devices for storing hose by the provision of a hose rack which is attached to the water supply pipe.

A primary object of the invention is to provide a hose rack which is extremely simple in construction and therefore, inexpensive to both the manufacturer and consumer.

Another object of the invention is to provide a hose rack which can be quickly and easily assembled on the water pipe by a person not necessarily skilled in the mechanical art and by the use of few and simple tools.

A further object of the invention is to provide a hose rack which is suitably protected from the water pipe to which it is attached as to prevent any corrosion between them.

A still further object of the invention is to provide a hose rack which, by being used in combination with the wall of a building is reduced to the barest number of parts, as the said wall through which the water pipe is passed provides one side of the rack to hold the hose against lateral dislodgement.

With the above and other objects in view the invention consists in the novel features of construction, arrangements and combinations of parts set out herein and shown and more particularly pointed out in the claims for novelty following.

In describing the invention reference will be had to the accompanying drawings, in which:

FIGURE 1 is an exploded view in perspective of a water tap and its supply pipe and bushing and one of the two rack sections which comprise the invention.

FIGURE 2 is a perspective view of the hose rack of the invention shown completely assembled on the water supply pipe leading to the tap.

FIGURE 3 is a side elevation of the hose rack, fully assembled and supporting a hose, the hose being shown in section.

Like numerals of reference indicate corresponding parts in the various figures.

Referring to the drawings, 1 denotes a water supply pipe extended from the interior of a building outwardly through a wall and passing through a rubber or plastic, lengthwise split, bushing 2 which fits over the water pipe 1 in the opening 3 through the wall 4, the said water pipe carrying on its end a tap fitting 5 having a nozzle 3a adapted to threadingly receive the fitting 6 of a hose 8.

The hose rack, denoted generally by the numeral 9, consists of two identical sections 10 and 11, each made of rigid strap material, such as metal, plastic, or other suitable material. Each rack section is formed to provide a semi-cylindrical medial portion 12 adapted to fit over the bushing 2, the said semi-cylindrical part being flanked by short lateral flat parts 13 adapted to oppose the similar parts of another section in slightly spaced relation and to be secured to said similar parts of the other section by threaded bolts 14 extended through suitable apertures in the opposing parts 13 to secure the rack sections to the bushing firmly to prevent the rack from rotating. The semi-cylindrical parts 12 of the rack sections are together of slightly less interior diameter than the outside diameter of the bushing 2 so that when said parts 12 are placed in opposition on the bushing the said parts 12 will on the turning down of the bolts 14 compress the said parts 12 into gripping engagement with the bushing to keep the rack from turning on the bushing.

It will be noted that the edges of the medial portions 12 and the portions of the rack sections abut the adjacent wall 4. Thereafter, at the ends of the parts 13 the strap parts are twisted sharply to provide short parts 15 which are adapted to lie in surface engagement with the wall 4 in radial relation to the bushing, which constitutes the hub of the rack. Thus are provided four spaced apart radial arms 16, 17, 18 and 19. These radial arms are bent outwardly at right angles to the building wall 4 to provide substantially horizontal arms which together provide the support around which the hose 8 is wound, as shown in FIGURE 3.

The arms 16, 17, 18 and 19 have outwardly turned marginal parts 20 which constitute flanges which prevent dislodgement of the hose at one side of the rack.

The hose is thus carried on the arms 16, 17, 18 and 19 and held from dislodgement at one side of the rack by the wall 4 and at the other side by the flanges 20.

In the use of this invention the hose may be wound around the rack while its one end is still connected to the tap, or it may be disconnected from the tap and then wholly wound onto the rack. In either event the invention provides a support for the hose which closely encircles the tap and so makes unnecessary the carrying of the hose to and away from the tap, which is not always practical immediately after the water supply to the hose has been shut off owing to the fact that water drips from the hose for a considerable time thereafter.

The hose rack of the present invention is very inexpensive to manufacture because of its unique construction whereby the edges of the radially arranged arms 15 abut the building wall at one side of the rack, so that the hose at that side of the rack is held against lateral dislodgement by the building wall.

While there has been shown and described herein the presently preferred form of construction and arrangement of parts for carrying out the said invention, this capable of variation and modification within the scope of the appended claims.

What we claim is:

1. In a hose rack in combination with a wall and a water pipe extending therethrough, said hose rack comprising a plurality of arm members secured medially of their length to said water pipe and extending substantially radially outwardly therefrom, means for securing said arms to said water pipe against rotation, said arm members being bent and rebent at their marginal parts to form hose supporting pieces substantially parallel with and spaced from said water pipe and outwardly extending flanges.

2. In a hose rack, in combination with a wall and a water pipe extending therethrough, two substantially identical, mirror-image arm members, each of said members being formed from rigid strap material to include a semi-cylindrical medial portion, adapted with the semi-cylindrical portion of the other of said arm members to embrace said water pipe, a pair of diametrically opposed, short, lateral flat parts extending outwardly from said medial portion; said strap material thereafter being twisted rearwardly and outwardly from each of said flat parts to form a pair of co-planar arms, each of said arms thereafter being bent forwardly substantially at right angles to form a hose support piece extending parallel to said water pipe; and each of said support pieces terminating in a radially outwardly extending flange.

3. In a hose rack, in combination with a wall and a water pipe extending therethrough, two substantially identical, mirror-image arm members, each of said members being formed from rigid strap material to include a semi-cylindrical medial portion, adapted with the semi-cylindrical portion of the other of said arm members to embrace said water pipe, a pair of diametrically opposed, short, lateral flat parts extending outwardly from said medial portion; said strap material thereafter being twisted rearwardly and outwardly from each of said flat parts to form a pair of co-planar arms, each of said arms thereafter being bent forwardly substantially at right angles to form a hose support piece extending parallel to said water pipe; and each of said support pieces terminating in a radially outwardly extending flange; a bushing inserted between said semi-cylindrical portions and said water pipe, and means securing together said flat parts of said arms at opposite sides of said semi-cylindrical medial parts of said arms to secure said arm members against rotation with respect to said water pipe.

4. In a hose rack, in combination with a wall and a water pipe extending therethrough, a bushing surrounding said water pipe, a plurality of rigid, strap-like arms bent to provide semi-cylindrical portions medially of their ends adapted to embrace said bushing, means to secure said arms to one another at opposite sides of said semi-cylindrical medial portions to mount said arms against rotary movement with respect to said water pipe; said arms being twisted and turned laterally beyond said semi-cylindrical portions to provide short portions adapted to extend outwards in surface engagement with said wall; said arms thereafter being bent outwards from said wall to provide hose supporting pieces paralleling said water pipe and having marginal end parts turned outwards to parallel said wall and with said wall providing hose stops at the ends of said hose supporting pieces.

References Cited

UNITED STATES PATENTS

| | | | |
|---|---|---|---|
| 1,284,022 | 11/1918 | Wright | 108—161 |
| 2,517,118 | 8/1950 | Lee | 248—89 |
| 2,681,251 | 6/1954 | Fortener | 299—77 |
| 2,956,762 | 10/1960 | Alston | 248—87 |

FOREIGN PATENTS 254,517   12/1948   Switzerland.

JOHN PETO, *Primary Examiner.*

CLAUDE A. LE ROY, *Examiner.*

K. J. WINGERT, *Assistant Examiner.*